(12) United States Patent
Rossini et al.

(10) Patent No.: US 12,521,904 B2
(45) Date of Patent: Jan. 13, 2026

(54) APPARATUS AND METHOD FOR APPLYING IN AN AUTOMATIC WAY FOAM ELEMENTS ON A DIE CUTTER

(71) Applicant: PRO FORM S.R.L., Bergamo (IT)

(72) Inventors: Alberto Luigi Rossini, Bergamo (IT); Zivota Milic, Bergamo (IT)

(73) Assignee: PRO FORM S.R.L., Bergamo (IT)

( * ) Notice: Subject to any disclaimer, the term of this patent is extended or adjusted under 35 U.S.C. 154(b) by 860 days.

(21) Appl. No.: 17/755,039

(22) PCT Filed: Oct. 6, 2020

(86) PCT No.: PCT/IB2020/059374
§ 371 (c)(1),
(2) Date: Apr. 19, 2022

(87) PCT Pub. No.: WO2021/090085
PCT Pub. Date: May 14, 2021

(65) Prior Publication Data
US 2022/0288804 A1   Sep. 15, 2022

(30) Foreign Application Priority Data
Nov. 4, 2019   (IT) .................. 102019000020260

(51) Int. Cl.
*B26F 1/44*   (2006.01)
*B25J 9/16*   (2006.01)
(Continued)

(52) U.S. Cl.
CPC .............. *B26F 1/44* (2013.01); *B25J 9/1697* (2013.01); *B25J 15/0071* (2013.01);
(Continued)

(58) Field of Classification Search
CPC .... B25J 15/0071; B25J 11/005; B25J 9/1697; B26F 1/44; B26F 1/24; B26F 2001/4463;
(Continued)

(56) References Cited

U.S. PATENT DOCUMENTS 3,498,661 A  *  3/1970  Graziano  ........... A47G 27/0493
294/8.6
3,608,890 A  *  9/1971  Littlefield  ................ B65H 3/22
271/21
(Continued)

FOREIGN PATENT DOCUMENTS

CN   107745984 A  *  3/2018  ............... B65H 5/10
DE   202011110569 U1   10/2014
(Continued)

*Primary Examiner* — Laura M Lee
(74) *Attorney, Agent, or Firm* — MASUVALLEY & PARTNERS; Peter Martinez (57) ABSTRACT

An apparatus and a method for automatically applying, without the intervention of an operator, rubber elements on a die-cutter during the manufacturing step thereof. The apparatus comprises a manipulator, preferably a robotic arm, and a needle gripper. The gripper withdraws the water jet pre-cut rubber elements from a sheet with double-sided adhesive tape, and places them one by one at the point provided for by the working program.

14 Claims, 5 Drawing Sheets

(51) Int. Cl.
*B25J 15/00* (2006.01)
*B26D 5/00* (2006.01)
*B26F 1/24* (2006.01)

(52) U.S. Cl.
CPC .............. *B26D 5/007* (2013.01); *B26F 1/24* (2013.01); *B26F 2001/4463* (2013.01)

(58) Field of Classification Search
CPC .......... B26D 5/0007; B65H 3/22; B65H 5/08; B65H 5/14; B65H 5/16
USPC ..................................................... 83/123, 143
See application file for complete search history.

(56) References Cited

U.S. PATENT DOCUMENTS

| | | | | |
|---|---|---|---|---|
| 5,114,132 A * | 5/1992 | Arato | ..................... | B65H 3/22 |
| | | | | 271/18.3 |
| 5,409,368 A * | 4/1995 | Heiskell | ................ | B29C 51/445 |
| | | | | 271/84 |
| 5,474,219 A * | 12/1995 | Mano | ....................... | B26D 5/34 |
| | | | | 225/104 |
| 6,112,680 A * | 9/2000 | Hummer | ................ | A01G 20/15 |
| | | | | 172/19 |
| 6,309,001 B1 * | 10/2001 | Sherwin | .................. | A21C 9/08 |
| | | | | 294/100 |
| 7,536,946 B2 * | 5/2009 | Hinrichs | .............. | B25J 15/0071 |
| | | | | 271/18.3 |
| 8,104,807 B2 * | 1/2012 | Maffeis | ................ | B25J 15/0071 |
| | | | | 294/61 |
| 8,714,608 B2 * | 5/2014 | Cho | ..................... | B25J 15/0071 |
| | | | | 294/61 |
| 8,888,154 B2 * | 11/2014 | Tvetene | ..................... | B66C 1/22 |
| | | | | 294/128 |
| 9,758,323 B2 * | 9/2017 | Werni | ...................... | B65H 3/22 |
| 11,745,377 B2 * | 9/2023 | Bormann | ............. | B26D 7/1818 |
| | | | | 83/27 |
| 2018/0311830 A1 * | 11/2018 | Bertelmann | ............. | B65H 3/22 |
| 2022/0388181 A1 * | 12/2022 | Balsells Mercade | .. | B65G 47/90 |

FOREIGN PATENT DOCUMENTS

| | | | | |
|---|---|---|---|---|
| DE | 102017209661 A1 * | 10/2018 | .......... | B25J 15/0019 |
| ES | 2279659 A1 | 8/2007 | | |
| JP | H0744689 U * | 11/1995 | ............... | B26F 1/38 |
| WO | 2005000544 A2 | 1/2005 | | |
| WO | 2013074924 A1 | 5/2013 | | |
| WO | 2015053925 A1 | 4/2015 | | |

* cited by examiner

APPARATUS AND METHOD FOR APPLYING IN AN AUTOMATIC WAY FOAM ELEMENTS ON A DIE CUTTER

RELATED APPLICATIONS

This application is the U.S. National Phase of and claims priority to International Patent Application No. PCT/IB2020/059374, International Filing Date Oct. 6, 2020; which claims benefit of Italian Patent Application No. 102019000020260 filed Nov. 4, 2019; both of which are incorporated herein by reference in their entireties.

FIELD OF THE INVENTION

The present invention refers to an apparatus and a method for automatically applying, without the intervention of an operator, rubber elements on a die-cutter during the manufacturing step thereof.

STATE OF THE ART

Die cutting is a process known and very popular in several fields of the art, such as paper processing industry and typography. It is used to obtain, by cutting, pieces with a predetermined shape, sometimes even very complex, from a sheet or band of a relatively soft material, such as paper, cardboard, fabric, leather, metal sheet, some types of plastics.

Die cutting machines fundamentally comprise two components adapted to pressure cooperate together to cut die-cut elements from sheets or bands of material: the die cutter and the counter-die cutter.

The die cutter is formed by a flat or cylindrical support comprising a plurality of cutting rules (i.e. metal blades) provided with an active cutting edge. The cutting rules are cantileverly housed in suitable grooves obtained in the support with the cutting edge facing away from the support, and are longitudinally shaped and/or mutually arranged so as to correspond to a desired shape for the die cut elements.

The counter-die cutter is constituted of a flat or cylindrical support intended for abutting against the cutting rules. The die cutting is performed by contacting the die cutter and counter-die cutter one to each other with appropriate pressure, a sheet or band of material to die cut being interposed between them.

In addition to the real die cutting, the manufacture of die cut elements often provides further workings adapted to provide the die cut element with specific functional and/or aesthetic features.

One of these, largely used in the paper processing industry field, is the creasing, i.e. the printing of lines, just denoted as creased lines, on the die cut element, which are intended to allow and/or facilitate a subsequent accurate folding of die cut element portions without cracks or ruptures occurring in the material. Apart from the fact that the material is not cut but only deformed, the creasing process is similar to the die cutting process and thus is usually carried out together with the latter, in a single working step. In order to carry out creases, creasing rules are applied on the die cutter support, similarly to the cutting rules. The creasing rules are provided with an active rounded, not cutting, edge and are less projecting from the support surface with respect to the cutting rules. Therefore, they are metal blades provided with a folding, not cutting, rule. Corresponding creasing channels are arranged on the counter-die cutter, which are suitably sized depending on the sizes of the creasing rules and the type of material to work. The pressure interaction among the creasing threads of the die cutter and the creasing channels of the counter-die cutter during the die cutting causes the creasing lines to be created.

Generally, the support on which the cutting rules are mounted is made up of multilayer wood. The rules are inserted by interference in corresponding seats obtained in the support. The latter are generally obtained through laser cutting techniques. The insertion of the rules in the corresponding seats is usually made manually by an operator, often with the aid of a hammer.

Generally, the counter-die cutter comprises, instead, a metal plate or made of a metal alloy, such as for example steel, against which the cutting rules beat. Such a plate is advantageously worked so as to cooperate with the folding rules of the die cutter, as already mentioned. In other words, on the surface of the counter-die cutter intended to abut against the die cutter, creasing channels, i.e. grooves, are made at the respective creasing rules. In addition to aid deeper deformations, the creasing channels facilitate the deformation of the die cut element to create folding lines. The folding lines allow easily obtaining the folding of the die cut element along the same lines.

The rubber coating of a cutting-die is the operation by which a worker glues rubber elements onto the support of the die-cutter, at both sides of the cutting rules and the creasing rules, in abutment against them. The rubber elements, often simply called rubbers, are made of an elastic material that is compressed when the die-cutter is brought against the counter-die cutter, in order to perform—precisely—the die cutting, and returns to its original height when the stress ceases. The function of the rubber elements is to exert a thrust on the die-cut sheet so as to help it to be separated from the die-cutter, i.e. to prevent the sheet from getting stuck on the die-cutter even when the latter has been separated from the counter-die cutter. In practice, the rubber elements function as ejection elements to eject the die-cut sheets, and for this reason they will be defined hereinafter ejection rubber elements.

A short guide is available at the following link: https://howtobuypacking.com/cutting-die/.

Rubber coating is the last stage in the process of assembling a die-cutter. At present the rubber coating of the die-cutters is carried out manually: the workers receive a rubber sheet in which the required ejection elements are pre-cut. Based on their own experience, the workers manually and selectively withdraw the ejection rubber elements, one by one, separating them from the respective sheet, and glue them on the die-cutter support, with quick-setting glue or double-sided adhesive tape, in the position predetermined for each element. The ejection rubber elements have shapes different from each other, because they have to be placed side by side with different sections of the cutting or creasing rules; therefore, the worker must be skillful at avoiding positioning errors.

The rubber coating of the die-cutter is a time-consuming and tricky operation, which must be carried out by experienced people; it is therefore desirable to make the rubber coating as fast as possible.

A further limitation of the known art is that the length of the ejection rubber elements cannot be reduced too much, because beyond a certain limit a human being would no longer be able to distinguish one shape from another. The need to work with ejection rubber elements having a minimum length that allows the worker to correctly identify them, means that the pattern of the cutting and creasing rules, which can also define acute angles or curved sections, cannot always be followed in an optimal way and often involves a considerable amount of waste. Considering that the cost of rubber sheets has a substantial impact on the final cost of the die-cutter, because it is comparable to the cost of the steel sections used to create cutting and creasing rules, it is desirable to be able to minimize rubber consumption.

DE 20 2011 110569U1 describes a needle manipulator. The needles are removable from, and retractable into, a front head according to variable strokes that depend on the supply voltage and/or current of the respective electric actuator. Therefore, the needles can be completely extracted and completely retracted, but they can also be stopped at an intermediate stroke. Between the electric actuator and the needles, a mechanism, e.g. a rack mechanism, cam mechanism, etc., is provided.

WO 2015/053925 describes a pick-and-place device configured for gripping fabrics. The head of the pick-and-place is equipped with a layer of hooked fabric, capable of stapling the fabric to be withdrawn. The portion where the hooked fabric is present is retractable to obtain the detachment of the manipulated fabric.

WO 2005/000544 and WO 2013/074924 describe other known-in-the-art solutions, for making die-cutters and positioning objects with manipulators, respectively.

SUMMARY OF THE INVENTION

Object of the present invention is therefore to provide an apparatus and a method that allow the rubber coating of the die-cutter to be completed in a simple, rapid, efficient way, without the intervention or with minimum intervention of human operators, and with minimum quantities of rubber.

Therefore, the present invention, in a first aspect thereof, concerns the apparatus according to claim 1 for automatically applying ejection rubber elements on a die-cutter.

In particular, the apparatus comprises a manipulator equipped with a needle gripper. In turn, the gripper comprises a front surface, which is intended to be configured as a countercheck surface for the ejection rubber elements that each time are withdrawn and moved, and a plurality of retractable needles. The needles are movable with respect to the front surface, under the thrust of a dedicated actuator, between an extracted position, at which the needles cantileverly extend from the front surface and a retracted position, at which the needles remain flush with the front surface.

The needles are brought and held in the extracted position to penetrate into an ejection rubber element to be withdrawn, for example an ejection element in a pre-cut rubber sheet resting on the working plane. The needles are brought and held in the retracted position to disengage the ejection rubber element released on a die-cutter, i.e. to slip out of the gripper from the ejection rubber element just placed on the die-cutter and thus to free the manipulator so that it can grip and position another ejection rubber element.

Advantageously, the needles can be stopped at an intermediate position in-between the extracted position and the retracted position, to lay down the ejection rubber element against the front surface, which can be also defined countercheck surface, without disengaging the ejection rubber element. This feature is important to allow a precise optical recognition of the ejection rubber element each time manipulated. In fact, since the ejection elements are made of a rubber that is yielding, these elements are extremely difficult to be manipulated with the traditional movable-jaw grippers. The use of needle grippers is also difficult, because almost always the ejection rubber elements that are lifted from the working plane, and in particular from the pre-cut sheet, take an inclined arrangement with respect to the front surface of the manipulator, with random inclination. This causes each ejection rubber element withdrawn by the gripper to take a position that does not comply with the manipulator's reference system and therefore without the solution according to the present invention it would be impossible to automatically and systematically obtain the correct positioning of each ejection rubber element on the corresponding die-cutter.

It must also be considered that not only the rubber of the ejection elements is yielding, and therefore tends to move more or less randomly during needle penetration, but also that each ejection element remains in any case constrained to the respective sheet, even if pre-cut, and not all the ejection elements have the same resistance to separation from the sheet as this depends on the shape of each ejection element, and therefore the resistance is not predictable and is often also the cause of misalignment with respect to the front surface of the manipulator.

Therefore, the present invention makes it possible to overcome these drawbacks and to obtain the rubber coating of the die-cutter in a simple, quick, efficient, and substantially automated way, and with minimal material waste.

In practice, the possibility to partially retract the needles to align the ejection rubber element to the front surface, and therefore to align it with respect to the manipulator reference system, allows the implementation of an optimal optical recognition of the piece withdrawn, even if it is small and initially inclined, and allows it to be properly positioned on the die-cutter, exactly at the portion of cutting/creasing rule univocally corresponding to the ejection element each time manipulated.

The manipulator can be, for example, an anthropomorphic-arm manipulator type, or a Cartesian manipulator.

Preferably the apparatus also comprises a presser element movable with respect to the front surface to exert pressure on a sheet of ejection rubber elements that rests on a working plane, while the needles are gripping a single ejection rubber element. The presser element operates in coordination with the gripper to hold the sheet of ejection rubber elements on the working plane while the needles are inserted into a single ejection element and withdraw the latter from the sheet. In practice, the presser element intervenes to prevent the manipulator from lifting the entire sheet of ejection rubber elements.

Preferably the presser element is movable with respect to the front surface between:
 a distal position, at which it is at a distance from the front surface greater than the length of the needles in the extracted position, in order to hold a sheet of ejection rubber elements while the needles penetrate into a single ejection rubber element of the sheet, and
 a proximal position, at which the presser element is either behind the front surface or coplanar therewith.

In the preferred embodiment, the presser element at least partially surrounds the front surface, e.g. it extends with a rectangular perimeter, like a frame.

In an embodiment of the apparatus, the needles comprise a thickened portion, whose function is to create more friction with the rubber of the withdrawn ejection elements in order to maximize the grip and prevent them from accidentally disengaging. The thickened portion is near the tip of the needles.

The apparatus comprises an electronic control unit of programmable type. For example, the manipulator is an anthropomorphic mechanical arm equipped with a corresponding control unit able to move and precisely position the gripper in space. As mentioned above, the manipulator can also be of different types, for example a Cartesian manipulator.

The apparatus is also equipped with an optical recognition station, or can be interfaced with an existing optical recognition station equipped with capturing and processing means to capture and process images. Preferably the optical recognition station is equipped with a camera prearranged to take a picture of each ejection rubber element each time the gripper with an ejection rubber element speared on the needles is positioned by the manipulator in front of the camera. The optical recognition station, if needed, is equipped with a light source prearranged on the same side of the camera to illuminate the ejection rubber elements to be photographed.

Considering the presence of the optical recognition station, the control unit of the apparatus is preferably programmed for:
  a) aligning with the front surface the ejection rubber element withdrawn by partially retracting the needles, as explained above, so as to be sure to take a picture of the ejection rubber element properly positioned on the plane and not inclined. Thanks to this alignment operation, images that would lead to incorrect processing or comparison (e.g. due to parallax errors) can be prevented from being captured;
  b) positioning the ejection rubber element at the optical recognition station and capturing an image thereof, with the ejection element plane with the front surface of the gripper,
  c) comparing the captured image with the images from a virtual library of templates (of ejection rubber elements) stored in the control unit in order to identify the corresponding template and then recognize that ejection rubber element, and/or with an image created by software and depicting the template of the ejection rubber element properly centered and oriented and/or processing the image to take measurements of the ejection rubber element held on the needles, and
  d) based on the comparison and/or the processing just described, controlling the movement of the manipulator and placing the ejection rubber element on the die-cutter, next to the corresponding portion of either a cutting rule or a creasing rule.

The comparison referred to in step c), between the real image of the withdrawn ejection rubber element and the theoretical image of the same ejection rubber element properly positioned and oriented, makes it possible to obtain data relative to a possible roto-translation occurred during the withdrawal from the rubber sheet and therefore allows the required compensations to be adopted during the positioning on the die-cutter.

Thanks to the fact that the apparatus according to the present invention allows an optical recognition substantially free of errors to be carried out, i.e. it allows to recognize each withdrawn ejection rubber element, even if its size is so small as to easily mislead a human being, the rubber coating of the die-cutter is performed correctly, automatically and without the intervention of operators (except for special cases). A cutting rule length or a creasing rule length of the die-cutter univocally corresponds to each manipulated ejection rubber element and, as a result, the apparatus places each ejection rubber element next to the corresponding rule. For example, the ejection rubber elements are provided with a double-sided adhesive tape on the side intended to be leaned on the die-cutter, and therefore the ejection elements have just to be positioned by the manipulator on the die-cutter to make the double-sided adhesive tape adhere.

Since the ejection rubber elements lean against the front surface of the gripper and are not inclined or crooked, the positioning takes place by simply lowering the gripper at right angles onto the die-cutter in the manipulator reference system.

Once the positioning is successfully completed, the needles are retracted into the front surface of the gripper and the apparatus is ready for a new cycle of gripping and positioning another ejection rubber element.

Preferably, the apparatus also comprises detecting means, mounted on the manipulator, to detect the point distance between the front surface and a working surface, for example a working plane on which the die-cutter to be assembled is placed, or the upper surface of the die-cutter subject to assembly positioned on the working plane. These means can be, for example, optical means, such as a laser, or electromechanical means, such as a touch probe. In an initial calibration step of the apparatus, the height of the working plane (coordinate z) and the height of the upper face of the die-cutter (coordinate z') can be detected in several points by using the manipulator. Thanks to this detection it is possible to verify if the die-cutter is really flat, and in this case the difference $z'-z$ will be constant, or it is slightly curved, or warped, and in this case the difference $z'-z$ will not be constant. By using the just described detecting means, the apparatus is able to capture the coordinates z' of n points of the die-cutter. These pieces of information are used to precisely position the ejection rubber elements while compensating for any differences of height, i.e. along the approaching direction of the gripper to the die-cutter, between the coordinate z' that would result in case the die-cutter was perfectly flat, and the actually measured coordinate z'.

In a similar way, by using the manipulator, at an initial calibration step of the apparatus, the coordinates x, y of both the die-cutter and the rubber sheet in the working plane can be detected, i.e. the coordinates x, y of specific reference points of the die-cutter and the rubber sheet can be detected.

For this just described technical feature, i.e. for the possibility of detecting the distance between the front surface of the gripper and the working plane, or the upper surface of the die-cutter positioned on the working plane, the Applicant reserves the right to file a divisional patent application.

A second aspect of the present invention relates to the method according to claim 11 to coat with rubber a die-cutter.

In particular, the method comprises:
  a') providing a rubber sheet containing a plurality of pre-cut ejection elements, and placing the sheet on a working plane;
  b') providing a die-cutter equipped with a support and a plurality of cutting rules and/or creasing rules inserted in the support;
  c') providing an apparatus according to the present invention and, through the apparatus, automatically carrying out at least the following operations:
  d') inserting in a single ejection rubber element the needles in the extracted position so as to spear the former, and lifting the manipulator in order to separate that ejection element from the rubber sheet;
  e') aligning the ejection rubber element with the front surface of the apparatus, by partially retracting the needles to the intermediate position, up to bring a face of the ejection rubber element to lean against the front surface so as to allow an image of the ejection rubber element to be captured in that position, and f') releasing the ejection rubber element onto the die-cutter.

The advantages offered by the method are the same described above in relation to the apparatus: the alignment of the ejection rubber elements on the front surface allows optimal images for the optical recognition of each ejection element to be captured, which is a prodromal condition for the proper positioning on the die-cutter.

In fact, the method preferably provides:

g') capturing an image of the ejection rubber element leaned against the front surface, i.e. laid down on the surface with its face in contact therewith, and comparing it, for example by optical recognition software, with images from a virtual library of templates of ejection rubber elements, in order to identify the corresponding template, and/or with an image created by software and depicting the template of the ejection rubber element properly centered and oriented, and/or processing the image to take measurements of the ejection rubber element.

As mentioned above, the step f') is implemented based on the comparison and/or processing of step g'), so as to place the ejection rubber element on the die-cutter next to the portion of a cutting rule or creasing rule univocally corresponding to that ejection element. Preferably, since the final release position is known, any movements in the plane x, y and any incorrect orientation of the ejection rubber element are detected via the recognition system. Preferably the method also comprises the following step, for which the Applicant reserves the right to file a divisional patent application:

h') measuring, for example by means of a touch probe or an optical device, the distance between the front surface and the working plane and between the front surface and the upper face of the die-cutter and, during step f'), compensate for any errors of coplanarity between the die-cutter and the working plane. The advantages are the same described above in relation to the apparatus.

BRIEF LIST OF THE FIGURES

Further characteristics and advantages of the invention will be more evident by the review of the following specification of a preferred, but not exclusive, embodiment, which is depicted for illustration purposes only and without limitation, with the aid of the attached drawings, in which.

DETAILED DESCRIPTION OF THE INVENTION

Referring to FIGS. 1-7 the number 1 generally denotes an apparatus according to the present invention, which involves the whole rubber coating process of the die-cutters starting from pre-cut rubber sheets 2, on which multiple ejection elements are defined. The apparatus 1 carries out the positioning of each ejection rubber element on the die-cutter, in the univocally corresponding position, in turn imposed by the scheme of the cutting rules and creasing rules that are on the die-cutter.

Figure 1:
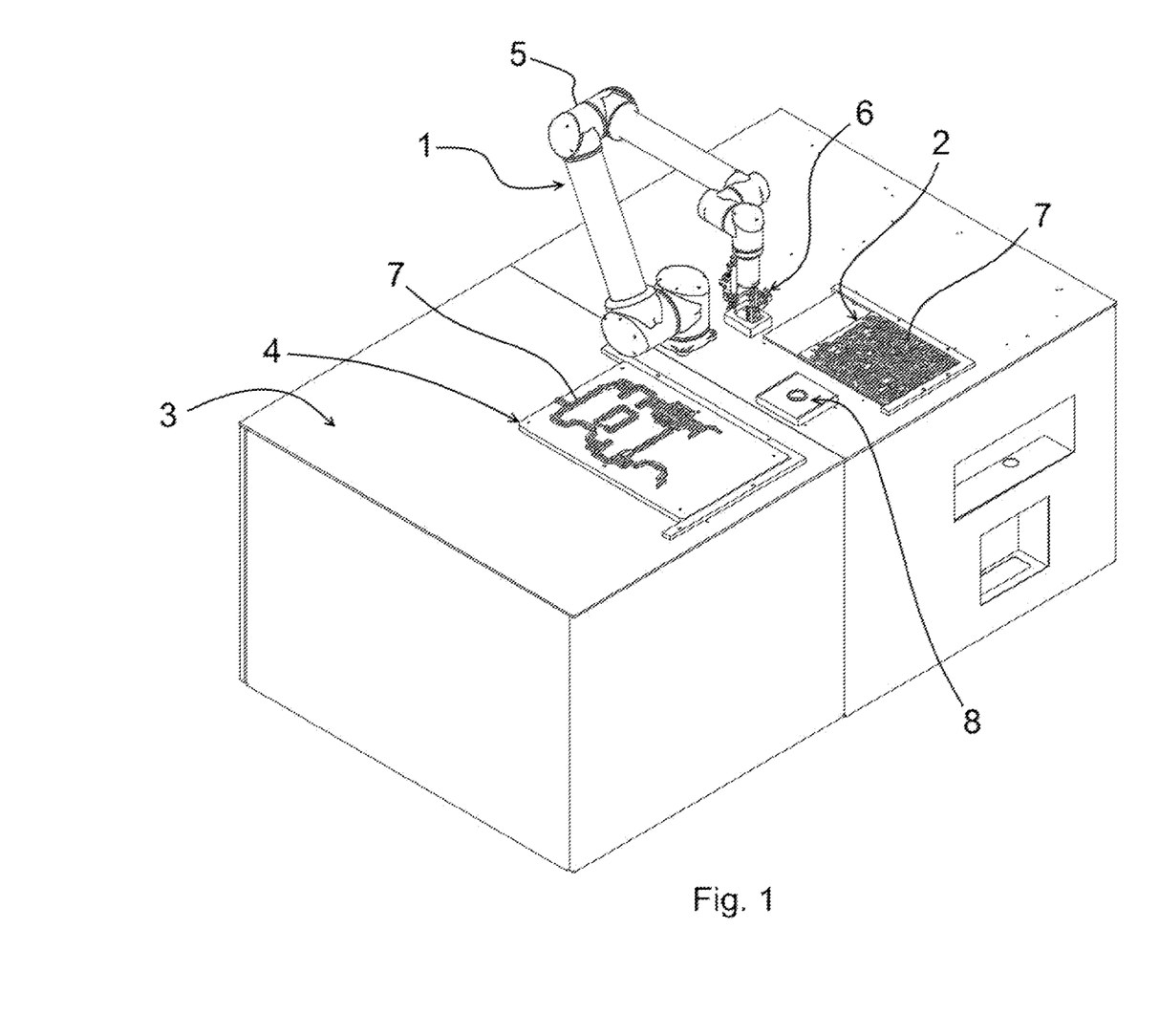
FIG. 1 is a perspective view of an apparatus according to the present invention arranged on a working plane.

The apparatus 1 is arranged on a working plane 3, for example having dimensions of 2000×1600 mm, in order to process die-cutters 4 with dimensions up to 1600×1100 mm. The apparatus comprises a manipulator 5, which in the model shown in the figures is an anthropomorphic arm, at whose end a gripper 6 specially designed for withdrawing and positioning ejection rubber elements 7 from the sheet 2 and for positioning the latter on the die-cutter 4, in particular on the support of the die-cutter 4, is mounted.

As an alternative to the anthropomorphic arm 5, the manipulator can be of the Cartesian axis type, commonly known as the Cartesian manipulator, an example is described in EP 1839798.

The apparatus 1 is equipped with an electronic control unit (not shown), e.g. a computer, to quickly process the data required to move and position the arm 5, and to recognize and/or measure the individual ejection rubber elements; the start and control of the apparatus 1 take place via a touch display (not shown).

The ejection rubber elements 7 are withdrawn one by one from the sheet 2 and positioned on the die-cutter 4 by means of a gripper 6, also called end-effector or EOAT (end-of-arm-tooling), constrained to the arm 5 and described later.

An optical recognition station is generally denoted by the reference 8.

Figure 2:
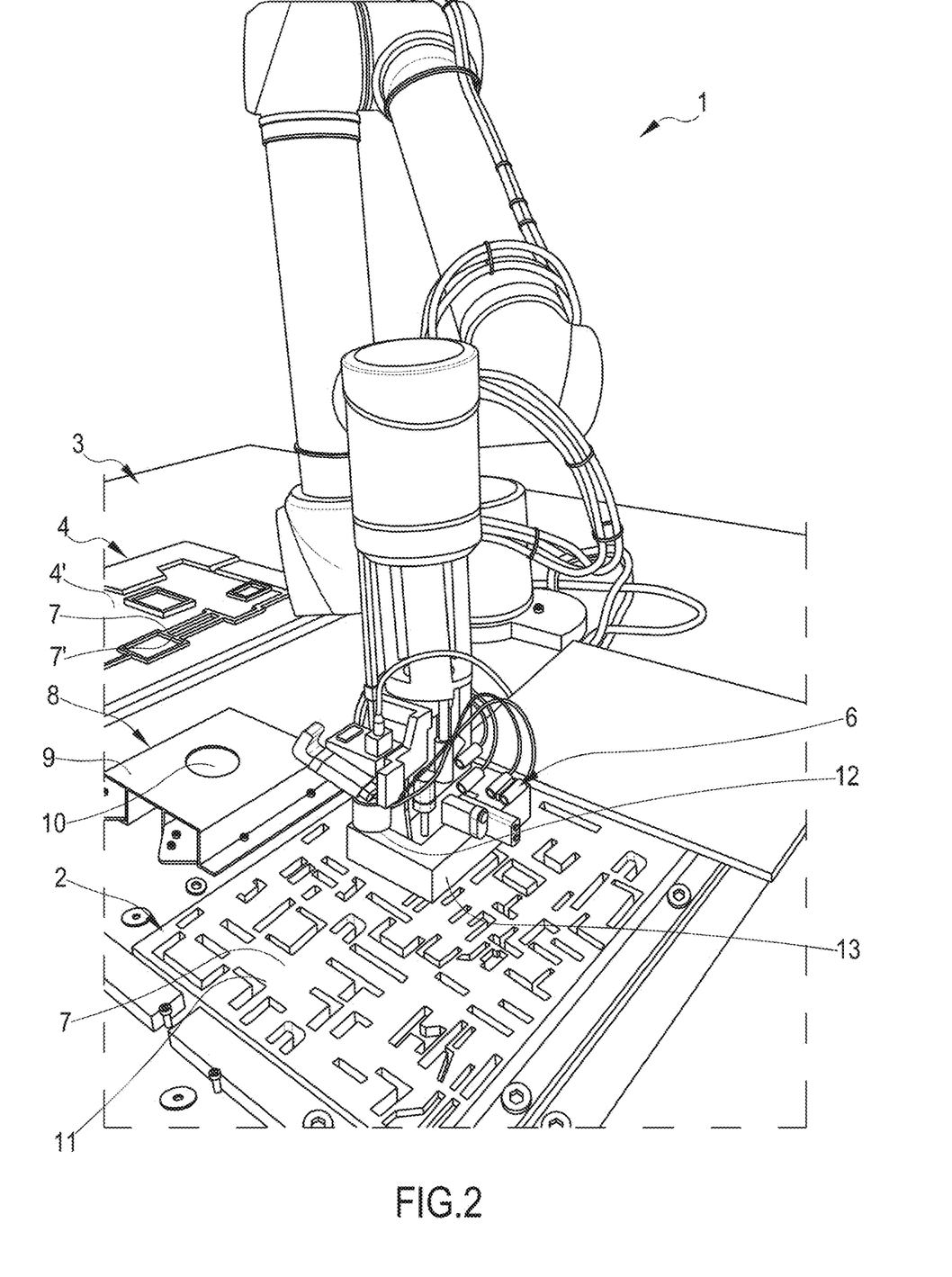
FIG. 2 is a picture of an operating prototype of the apparatus shown in FIG. 1.

FIG. 2 is a picture of an operating prototype of the apparatus 1. In FIG. 2 reference numerals similar to those used in the other figures denote similar components. In particular, as it can be appreciated in FIG. 2, the die-cutter comprises a wooden flat support 4' having cutting rules 7' and/or creasing rules 7' prearranged thereon and the ejection rubber elements 7 have to be combined therewith according to a univocal correspondence.

The optical recognition station 8 comprises a light source 9, e.g. a LED lamp, whose function is to illuminate the gripper 6, and a camera 10 whose function is to capture at least one frame of each ejection rubber element 7 withdrawn by the arm 5 by means of the gripper 6.

FIG. 2 also clearly shows the rubber sheet 2 in which the ejection elements 7 are pre-cut, e.g. by using the water-jet cutting technique. Reference 11 denotes the templates left free by the ejection rubber elements 7 already withdrawn.

The gripper 6 is also equipped with a camera 12 connected to the control unit, whose function is to detect the actual position of the die-cutter on the working plane and, if necessary, to capture images of the rubber sheet 2 in order to allow them to be processed and to allow the gripper to be properly positioned on the rubber ejection element 7 to be withdrawn. The reference number 13 denotes a presser element whose function will be explained later.

FIGS. 3-7 show the gripper 6 at different times during the operation of the apparatus 1.

Figure 3:
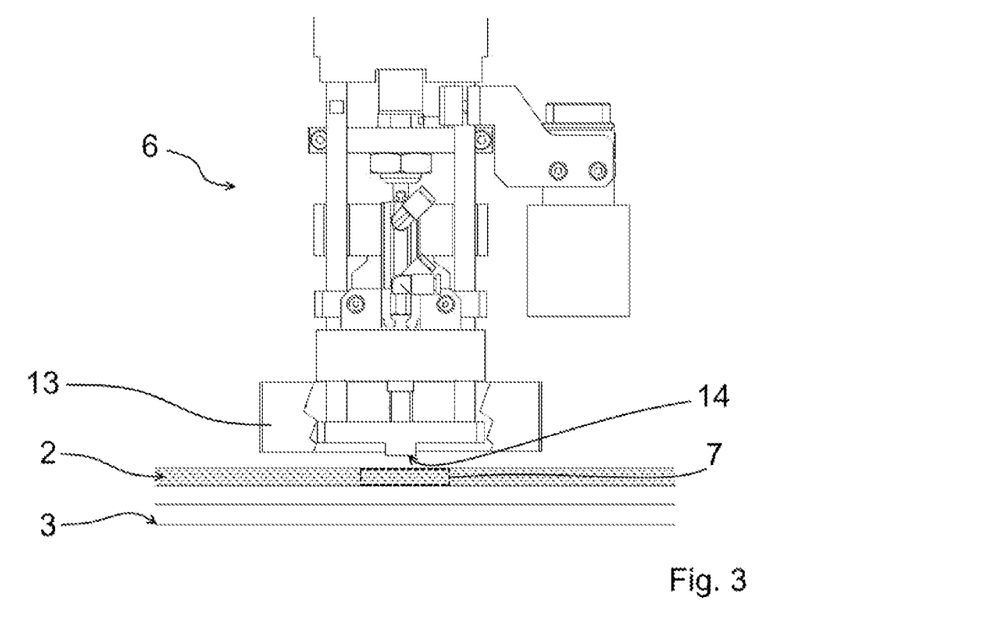

In particular, FIG. 3 is a schematic elevation view of the gripper 6 approaching the rubber sheet 2 positioned on the working plane 3. Since the apparatus 1 knows the position of the ejection rubber element 7 to be withdrawn, because it is specified in a corresponding file, the gripper 6 is brought at the vertical line passing through that ejection element 7, schematically shown in dotted lines, and the approach takes place right on this line, i.e. orthogonally to the working plane 3.

On the gripper there is a front surface 14 also defined countercheck surface, which is intended to be brought to lean on the ejection rubber element 7 to be withdrawn. The gripper 6 also comprises a plurality of needles that can be extracted from the front surface 14 and have precisely the function of being inserted into the ejection rubber element 7 to withdraw the latter. In particular, the needles are movable with respect to the front surface 14 between a fully extracted position adapted to spear the ejection rubber element 7, and a fully retracted position shown in FIG. 3, at which they are substantially flush with the front surface 14 and do not project therefrom.

When approaching the rubber sheet 2, the presser element 13 is in the respective proximal position, i.e. behind the front surface 14 or flush therewith, with respect to the rubber sheet 2.

Figure 4:
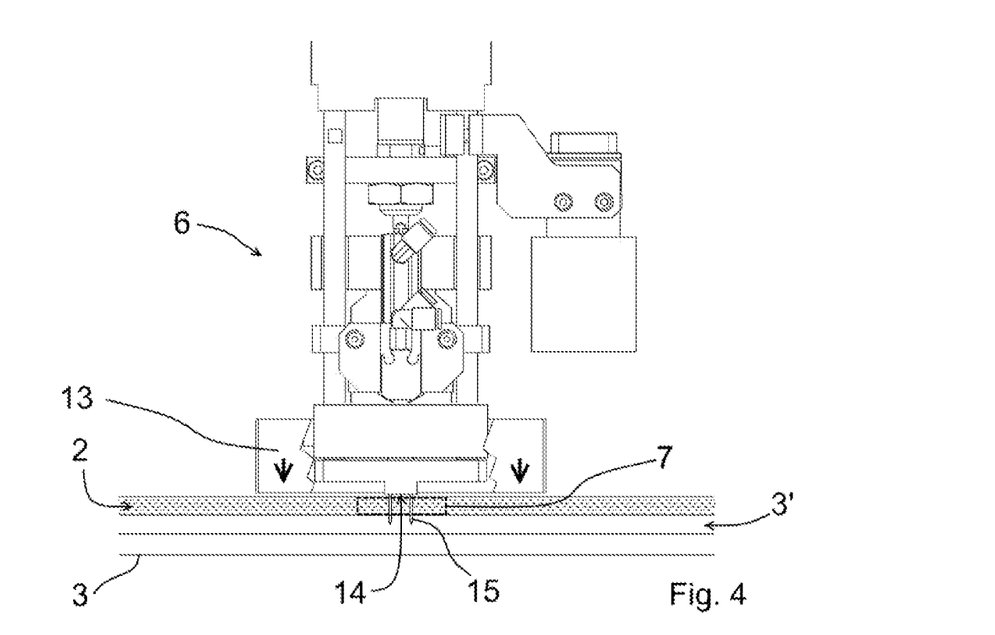
FIGS. 4-7 are schematic and elevation views of a portion of the apparatus shown in FIG. 1, at corresponding times during its operation.

FIG. 4 shows a subsequent step in which the fully extracted needles 15 spear into the rubber sheet 2, and in particular through the ejection element 7 to be withdrawn. The needles 15 pass through the element 7 and the tips of the needles 15 are inserted into a yielding layer 3', e.g. cardboard, placed between the working plane 3 and the rubber sheet 2.

Figure 5:
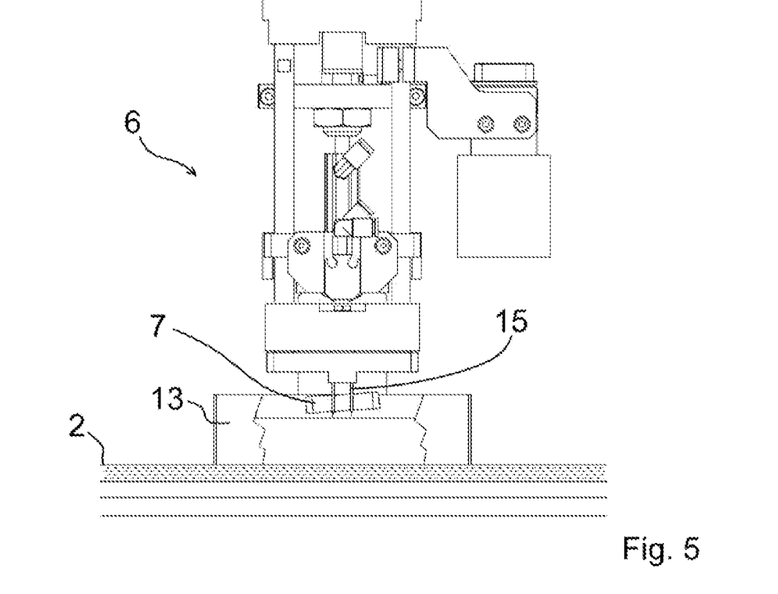

At this point the apparatus 1 is ready to lift the gripper 6 and detach the ejection rubber element 7 from the sheet 2. This is done, as shown in FIG. 5, by lowering the presser element 13 onto the rubber sheet 2, with a movement coordinated with the lifting of the front surface 14 while keeping the needles 15 completely extracted. In other words, with a movement similar to that of a nurse pulling the syringe out of a patient's body, the apparatus 1 lifts the gripper 6 while keeping the presser element 13 in abutment against the rubber sheet 2 until the needles 15 are above the rubber sheet 2, i.e. up to the height that corresponds to having separated the ejection rubber element 7 from the sheet 2. During this step, the presser element 13 reaches the respective proximal position, i.e. it reaches a lying plane placed under the tips of the fully extracted needles 15.

In order to move the presser element 13 with respect to the front surface 14, the gripper 6 is equipped with special actuators, visible but not numbered in FIG. 2. For example, pneumatic or electric linear guides are suitable for this purpose.

Figure 6:
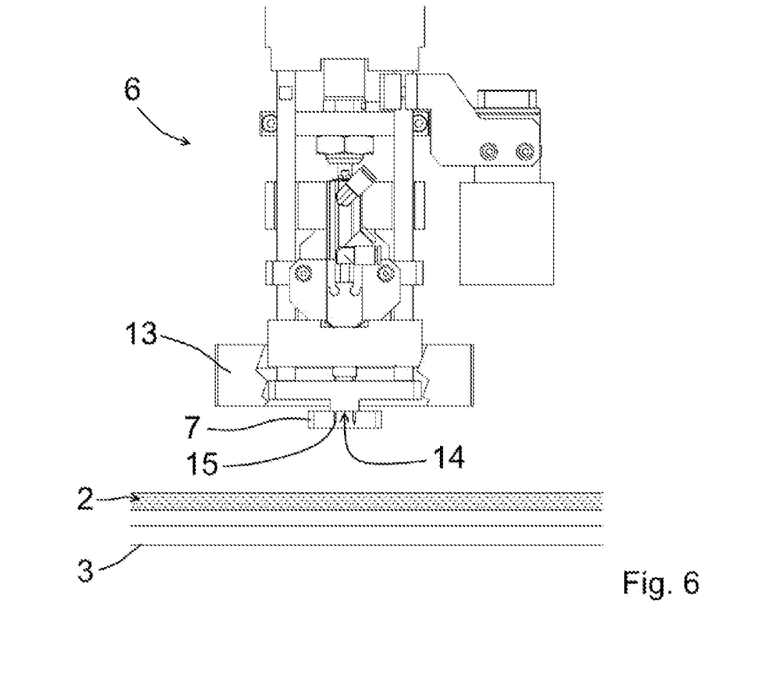

At this point the presser element 13 is also returned to its initial proximal position, as shown in FIG. 6. FIG. 6 also shows the feature of the apparatus according to which the needles 15 can be partially retracted in the front surface 14 in order to:
continue to hold the grip on the ejection rubber element 7, and
at the same time, align the ejection rubber element 7 to the front surface 14, i.e. to cause it to adhere to this surface.

As can be seen from FIG. 6, at this step the needles 15 do not come out of the lower surface of the ejection rubber element 7. When the alignment of the ejection rubber element 7 on the front surface 14 has been reached, de facto the ejection rubber element 7 is parallel to the working plane 3.

The just described feature allows the ejection rubber element 7 to be brought in front of the camera 10 of the optical recognition station 8 with a perfect orientation orthogonal to the optical axis of the camera, so that the captured images are not affected by a parallax effect and, as a result, optimal outcomes can be achieved by processing the captured images.

At this point the apparatus 1 moves the ejection rubber element 7 towards the optical recognition station 8, where it temporarily stops to allow a picture of the ejection rubber element 7 to be captured. The static image is sent to the control unit to be processed by means of special software, which can provide one or more of:
the direct detection from the image of the dimensions of the ejection rubber element 7, and/or;
the comparison between the captured image and the raster of the template correctly centered and oriented.

At this point, knowing the corrections to be made in the positioning of the ejection rubber element 7 in the plane x, y and the respective orientation with respect to the front surface 14, the apparatus can position the ejection rubber element 7 on the die-cutter 4, side by side the univocally corresponding cutting or creasing rule 7'.

Figure 7:
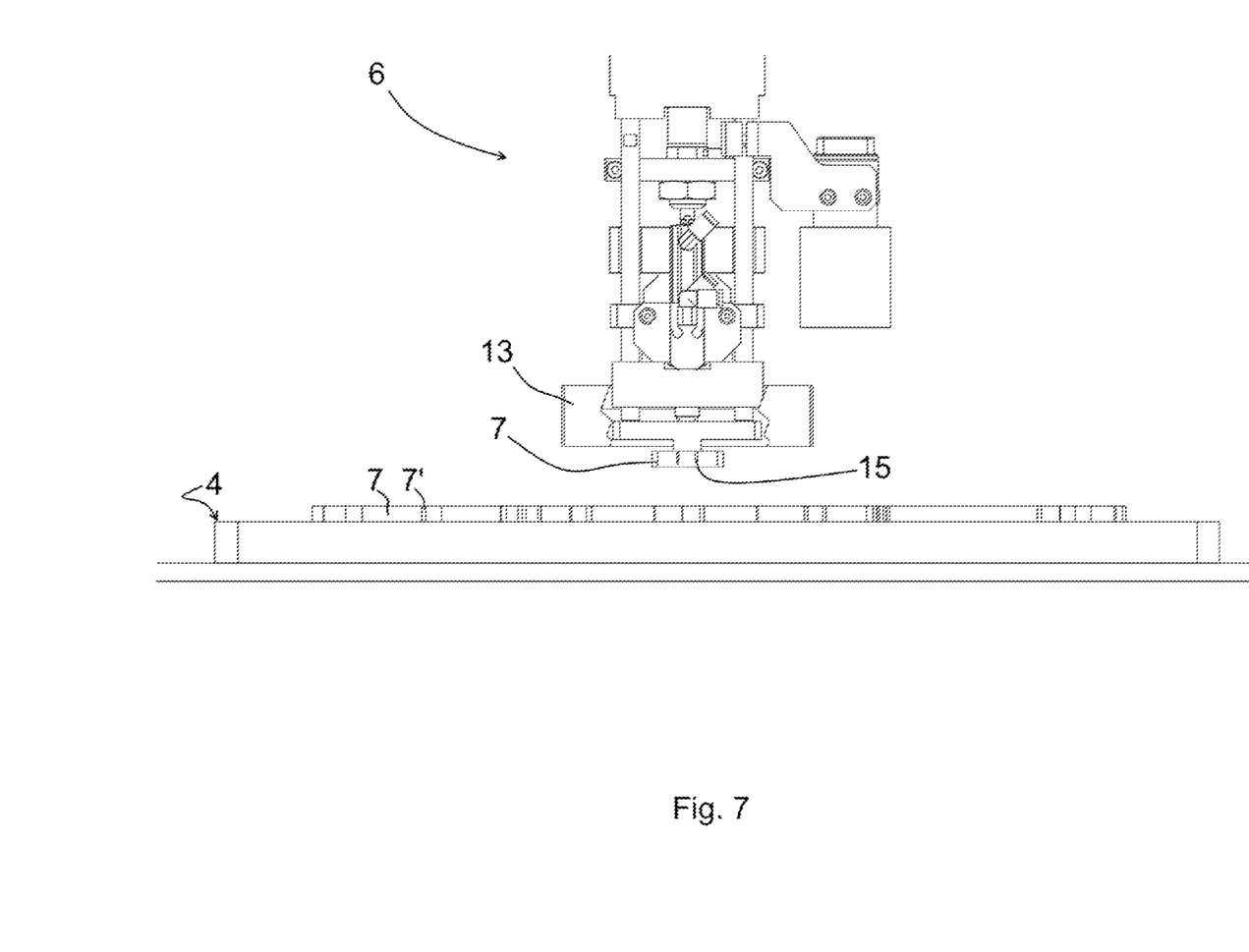

FIG. 7 shows a moment when the apparatus 1 is positioning the gripper 6 on the die-cutter 4. Once the precise point where the ejection rubber element 7 is to be released has been identified, the gripper 6 is lowered and the ejection rubber element 7 is laid down. For this reason the ejection rubber element 7 is preferably equipped with a layer of double-sided adhesive tape at the face facing the die-cutter 4. Alternatively, a glue layer can be used.

The orientation of the ejection rubber element 7 parallel to the working plane 3 also allows precise positioning on die-cutter 4 to be achieved.

Preferably, the apparatus 1 is also equipped with a load cell (not shown) placed between the anthropomorphic arm and the gripper 6; the load cell detects anomalies, if any, and therefore allows critical situations to be noticed, such as for example the wrong positioning of an ejection rubber element 7 or a wrong withdrawal.

Thanks to the load cell, or alternatively by exploiting a touch probe or a laser instrument, the apparatus 1 is able to detect the distance between the front surface 14 and the working plane 3 or the die-cutter 4, or else the rubber sheet 2. This way, possible errors of coplanarity between the working plane 3 and the die-cutter 4, which are caused by convexity of the die-cutter 4, in a direction orthogonal to the working plane 3, can be compensated for.

The apparatus has several advantages:
labor saving;
reduction of rubber waste; a subdivision of the rubber sheet 2 into smaller ejection elements 7 with respect to what can be done by humans and allows their positioning on the die-cutter to be optimized, and allows a better rearrangement of the ejection rubber elements 7 on the rubber sheet 2, resulting in material savings.

Preferably the needles 15 can also be moved closer to and away from each other, in order to adapt the gripper 6 to the dimensions of the ejection rubber elements 7 to be manipulated. This movement increases the ejection capacity of the ejection rubber elements 7, because by activating this movement when the needles 15 are already inserted in the rubber, the grasp between each needle 15 and the ejection rubber element 7 increases.

Preferably when withdrawing an ejection element from the rubber sheet 2, the gripper 6 can tilt to maximize the grip.

The detailed description below refers to the prototype shown in FIG. 2 and tested by the Applicant. In particular, the following tests have been carried out by using the anthropomorphic arm UR10 fixed, as shown in the image, on the aluminum plane present on the next with dimensions of 1400×2000 mm.

1) Repeatability Test

Object: testing the repeatability of the robotic arm movements, starting from the value of 0.1 mm provided by the manufacturer;

Mode: once fixed a comparator on the left side of the plane, the accuracy in positioning the arm was measured by alternately moving the gripper 6 from the left side to the right side of the working plane with a displacement of about two meters; the results obtained were as follows:

linear movement at 30% speed: error of +/−0.03 mm;
linear movement at 60% speed: error of +/−0.03 mm;
linear movement at 100% speed: error of +/−0.04 mm;
axial movement at 100% speed: error of +/−0.08 mm.

Conclusions: starting from the provided rated data, the repeatability test was positive; in all 4 cases there was an initial deviation from the theoretical final position of about 0.1 mm; this deviation is automatically corrected in a short time (0.5 s) and leads to the above stated results.

2) Positioning Test of the Ejection Rubber Elements

Object: simulating the final operation of the apparatus 1.

Modes: first, the piece gripping position and the final releasing position were manually detected; then, the routes and working sequences of gripper 6 were defined. Currently the tested prototype has achieved cycle times of about 6 seconds; by optimizing the routes, acceleration and deceleration ramps, speeds and movement modes, as well as pauses, a further reduction of cycle times to about 5.5 seconds can be provided.

The invention claimed is:

1. An apparatus (1) for automatically applying ejection rubber elements (7) on a die-cutter (4), comprising a manipulator (5) equipped with a needle gripper (6),
    wherein the gripper (6) in turn comprises:
    a front surface (14),
    a plurality of needles (15) movable with respect to the front surface (14) between an extracted position, at which the needles (15) cantileverly extend from the front surface (14) to penetrate into an ejection rubber element (7) to be withdrawn, and a retracted position, at which the needles (15) remain flush with the front surface (14) to disengage the ejection rubber element (7) released on a die-cutter (4),
    characterized in that the needles (15) can be stopped at an intermediate position in-between the extracted position and the retracted position, to lay down the ejection rubber element (7) against the front surface (14), without disengaging the ejection rubber element (14);
    the apparatus (1) further comprising a programmable control unit and an optical recognition station (8) equipped with capturing and processing means (10) to capture and process images, and wherein the control unit is programmed for:
    a) aligning the withdrawn ejection rubber element (7) with the front surface (14),
    b) placing the withdrawn ejection rubber element (7) at the optical recognition station (8) and capturing an image thereof,
    c) comparing the captured image of each ejection rubber element (7) withdrawn by the needles (15) with images from a virtual library of templates of ejection rubber elements (7) in order to identify the corresponding template, and/or with an image created by software and depicting the template of the ejection rubber element properly centered and oriented, and/or processing the image to take measurements of the withdrawn ejection rubber element (7), and d) based on said comparison and/or said processing, controlling the movement of the manipulator and placing the ejection rubber element (7) on the die-cutter (4), next to the corresponding portion of either a cutting rule (7') or a creasing rule (7') of the die-cutter (4).

2. The apparatus (1) according to claim 1, comprising a presser element (13) movable with respect to the front surface (14) to exert pressure on a sheet (2) of ejection rubber elements (7) that rests on a working plane (3), while the needles (15) are gripping a single ejection rubber element (7).

3. The apparatus (1) according to claim 2, wherein the presser element (13) is movable with respect to the front surface (14) between:
    a distal position, at which the presser element (13) is at a distance from the front surface (14) greater than the length of the needles (15) in the extracted position, in order to hold a sheet (2) of ejection rubber elements (7) while the needles (15) penetrate into a single ejection rubber element (7) of the sheet (2) while the gripper (6) is lifted, and
    a proximal position, at which the presser element (13) is behind the front surface (14) or coplanar therewith.

4. The apparatus (1) according to claim 2, wherein the presser element (13) at least partially surrounds the front surface (14).

5. The apparatus (1) according to claim 1, wherein the needles (15) comprise a thickened portion to maximize the grip on the ejection rubber elements (7).

6. The apparatus (1) according to claim 1, wherein step d) also comprises compensating for any misalignments between the needles (15) and the ejection rubber element (7), in a plane parallel to the front surface (14), due to the yielding behavior of a rubber during the penetration of the needles (15).

7. The apparatus (1) according to claim 1, comprising detecting means, mounted on the manipulator, to detect the point distance between the front surface (14) and a working surface (3), a working plane on which the die-cutter (4) to be assembled is placed, or the upper surface of the die-cutter subject to assembly positioned on the working plane.

8. The apparatus (1) according to claim 7, wherein the distance detecting means comprise optical means comprising laser means, or a touch probe mounted on the manipulator.

9. The apparatus (1) according to claim 1, wherein step d) also comprises compensating for possible errors of coplanarity between the working plane (3) and the die-cutter (4), which are caused by convexity of the die-cutter (4), in a direction orthogonal to the working plane (3).

10. A method of equipping a die-cutter with one or more ejection rubber elements, comprising:
    a') providing a rubber sheet (2) containing a number of pre-cut ejection elements (7), and placing the sheet (2) on a working plane (3);
    b') providing a die-cutter (4) equipped with a support and a plurality of cutting rules (7') and/or creasing rules (7') inserted in the support;
    c') providing an apparatus (1) according to any one of claims 1-9 and, through the apparatus, automatically carrying out at least the following operations:
    d') inserting in a single ejection rubber element (7) the needles (15) in the extracted position, and lifting the manipulator in order to separate that ejection element (7) from the rubber sheet (2);
    e') aligning the ejection rubber element (7) with the front surface (14) of the apparatus (1), by partially retracting the needles (15) to the intermediate position up to bring a face of the ejection rubber element (7) to lean against the front surface (14) so as to allow an image of the ejection rubber element (7) to be captured in that position, and
    f) releasing the ejection rubber element (7) onto the die-cutter (4).

11. The method according to claim 10, comprising:

g') capturing an image of the ejection rubber element (7) leaned against the front surface (14) and comparing it with images from a virtual library of templates of ejection rubber elements (7) in order to identify the corresponding template, and/or with an image created by software and depicting the template of the ejection rubber element properly centered and oriented, and/or processing the image to take measurements of the ejection rubber element (7).

12. The method according to claim 11, wherein the step f) is implemented based on the comparison and/or processing of step g'), so as to place the ejection rubber element (7) on the die-cutter (4) next to the univocally corresponding portion of a cutting rule (7') or creasing rule (7').

13. The method according to claim 11, comprising: h') measuring by means of a touch probe or an optical device, the distance between the front surface (14) and the working plane (3) and between the front surface (14) and the upper face of the die-cutter (4) and, during step f), compensate for any errors of coplanarity between the die-cutter (4) and the working plane (3).

14. The method according to claim 11, wherein the comparison or processing of the captured image is carried out by means of optical recognition software a) mixing the biomass with 1-ethyl-3-methylimidazolium chloride and 1-ethyl-3-methylimidazolium acetate in a 3:7 molar ratio, and b) heating the mixture obtained in step (a) at a temperature below 80° C.

\* \* \* \* \*